(12) United States Patent
Sasada et al.

(10) Patent No.: US 10,241,284 B2
(45) Date of Patent: Mar. 26, 2019

(54) OPTICAL FIBER ASSEMBLY AND CONNECTION STRUCTURE OF OPTICAL FIBER ASSEMBLY AND ELECTRONIC DEVICE

(71) Applicant: HOSIDEN CORPORATION, Yao-shi, Osaka (JP)

(72) Inventors: Kosuke Sasada, Yao (JP); Takayuki Nagata, Yao (JP)

(73) Assignee: Hosiden Corporation, Yao-Shi, Osaka (JP)

( * ) Notice: Subject to any disclaimer, the term of this patent is extended or adjusted under 35 U.S.C. 154(b) by 0 days.

(21) Appl. No.: 16/043,566

(22) Filed: Jul. 24, 2018

(65) Prior Publication Data

US 2019/0041592 A1   Feb. 7, 2019

(30) Foreign Application Priority Data

Aug. 7, 2017   (JP) ................ 2017-152146

(51) Int. Cl.
*G02B 6/36* (2006.01)
*G02B 6/42* (2006.01)
*H01R 12/71* (2011.01)

(52) U.S. Cl.
CPC ........... *G02B 6/4261* (2013.01); *G02B 6/428* (2013.01); *G02B 6/4284* (2013.01); *H01R 12/716* (2013.01)

(58) Field of Classification Search
CPC ............ G02B 6/4292; H01R 13/65802; H01R 23/6873
USPC .............................. 385/92; 439/607.01, 939
See application file for complete search history.

(56) References Cited

U.S. PATENT DOCUMENTS

2006/0133739 A1   6/2006  Kim et al.
2013/0108224 A1   5/2013  Ishigami et al.
2017/0357065 A1  12/2017  Watanabe

FOREIGN PATENT DOCUMENTS

JP   2003098394 A   4/2003
WO  2016121173 A1   8/2016

OTHER PUBLICATIONS

Extended European Search Report for European Application No. EP 18184677.5, published by the European Patent Office (EPO), dated Dec. 18, 2018, including corresponding Communication, 1-page Annex, Information on Search Strategy, Abstract, and 6-page EPO Form 1703.

*Primary Examiner* — Phuong Chi T Nguyen
(74) *Attorney, Agent, or Firm* — Kilyk & Bowersox, P.L.L.C.

(57) ABSTRACT

An optical fiber including a circuit board, a converter, an optical fiber, an external connecting part, and a pressable part. The circuit board includes first and second faces opposite to each other. The first face has first and second regions being different regions. The second face has third and fourth regions on the opposite side to the first and second regions, respectively. The converter is an opto-electronic or electro-optic converter on the first region of the circuit board. The optical fiber includes a leading end portion optically connected to the converter. A circuit on the first region of the circuit board is electrically connected to the converter. The external connecting part is disposed on the fourth region of the circuit board. The pressable part is fixed to the circuit board and positioned on the second region of the circuit board without contacting the converter, the optical fiber, or the circuit.

18 Claims, 9 Drawing Sheets

OPTICAL FIBER ASSEMBLY AND CONNECTION STRUCTURE OF OPTICAL
FIBER ASSEMBLY AND ELECTRONIC
DEVICE

CROSS-REFERENCE TO RELATED
APPLICATION

The present application claims priority under 35 U.S.C. § 119 of Japanese Patent Application No. 2017-152146 filed on Aug. 7, 2017, the disclosure of which is expressly incorporated by reference herein in its entity.

BACKGROUND OF THE INVENTION

Technical Field

The invention relates to an optical fiber assembly, and a connection structure of the optical fiber assembly and an electronic device.

Background Art

Japanese Unexamined Patent Publication No. 2003-98394 discloses a conventional optical fiber assembly. This assembly includes a plurality of optical fibers integrated in a parallel arrangement, a converter circuit board, a plurality of converters, a circuit, a device circuit board, a connector for external connection, and a case. The converters are arranged in a row on the converter circuit board such as to face the respective insertion ends of the optical fibers. The device circuit board is provided on its front surface with the converter circuit board and the circuit, and on its back surface with the connector for external connection. These components are housed in the case, and the connector for external connection is exposed through an opening in the bottom of the case.

In order to connect the optical fiber assembly to an electronic device, the connector for external connection of the optical fiber assembly is brought into alignment with a mating connector on a host circuit board of the electronic device, and then the optical fiber assembly is pressed against the host circuit board. This allows the mating connector to be fitted into the connector for external connection, so that the optical fiber assembly is connected to the host circuit board.

SUMMARY OF INVENTION

As described above, as connection of the optical fiber assembly to an electronic device requires pressing the optical fiber assembly against the host circuit board, the optical fiber assembly is subjected to load during the pressing action.

The invention is made under the above circumstances to provide an optical fiber assembly that is connectable to an electronic device or other device without applying load on an optical fiber, a converter, or a circuit of the assembly. The invention also provides a connection structure of the optical fiber assembly and the electronic device.

An optical fiber assembly of an aspect of the invention includes a circuit board, a converter, an optical fiber, an external connecting part, and a pressable part. The circuit board includes a first face and a second face on the opposite side to the first face, the first face has first and second regions being different regions from each other, and the second face has a third region on the opposite side to the first region and a fourth region on the opposite side to the second region. The converter is an opto-electronic or electro-optic converter on the first region of the circuit board. The optical fiber includes a first portion being a leading end portion of the optical fiber, the first portion being optically connected to the converter. The circuit is disposed on the first region of the circuit board and electrically connected to the converter. The external connecting part is disposed on the fourth region of the circuit board. The pressable part is fixed directly or indirectly to the circuit board such as to be positioned on the second region of the circuit board without contacting the converter, the optical fiber, or the circuit.

The optical fiber assembly of this aspect is configured such that the external connecting part of the assembly is connectable to a host circuit board of an electronic device by pressing the pressable part with a load necessary for the connection. The pressable part is fixed directly or indirectly to the circuit board such as to be positioned on the second region of the circuit board. As such, the load applied on the pressable part will be transferred, via the circuit board, to the external connecting part located on the opposite side to the second region. However, the applied load will not be transferred to the converter, the first portion of the optical fiber, or the circuit. This is because the converter, the first portion of the optical fiber, or the circuit are placed on the first region of the circuit board and because the pressable part is not in contact with the converter, the optical fiber, or the circuit.

The first region of the circuit board may be positioned on one side of a first direction relative to the second region of the circuit board. The first direction may extend substantially parallel to the first face of the circuit board. The optical fiber may further include a second portion extending to the other side of the first direction, from the first portion of the optical fiber and across the second region of the circuit board. In the optical fiber assembly of this aspect can be downsized because the second region of the circuit board serves as a region across which the optical fiber extends.

The pressable part may include a cover portion and a pair of legs. The cover portion of the pressable part may extend over the second region of the circuit board and cover the second portion of the optical fiber in a noncontact manner. The legs of the pressable part may extend from the cover portion toward the circuit board on opposite sides of the second portion of the optical fiber without contacting the second portion, the legs being fixed directly or indirectly to the circuit board. The optical fiber assembly of this aspect is configured such that the cover portion and the leg of the pressable part are not in contact with the second portion of the optical fiber. As such, when the pressable part is pressed to apply load on the pressable part, the load will not be transferred to the second portion of the optical fiber.

The optical fiber assembly of any of the above aspects may further include a cover having electrical conductivity. The circuit board may further include a first mounting portion on one side of a first direction of the circuit board, and a second mounting portion on the other side of the first direction relative to the first mounting portion and the first region of the circuit board. The cover may include a cover body, a first attachment portion, and a second attachment portion. The cover body may cover the first and second regions of the first face of the circuit board, the converter, the first portion of the optical fiber, and the circuit. The first attachment portion may be fixed directly or indirectly to the first mounting portion of the circuit board. The second attachment portion may be fixed directly or indirectly to the second mounting portion of the circuit board. The pressable part may be constituted by a portion of the cover body that is located over the second region, and the second attachment portion. The optical fiber assembly of this aspect has a reduced number of components because the portion of the cover body over the second region and the second attachment portion also serve as the pressable part. In addition, the cover covers the converter, the first portion of the optical fiber, and the circuit, improving the EMC characteristics of the assembly.

The first mounting portion of the circuit board may include a first end portion on one side of a second direction and a second end portion on the other side of the second direction. The second direction may preferably intersect the first direction. The second mounting portion may include a first end portion on the one side of the second direction and a second end portion on the other side of the second direction. The circuit board may further include a pair of first stops and a pair of second stops. The first stops may include one and the other first stops on the one and other sides, respectively, of the second direction. The one first stop may be positioned on the other side of the first direction and may project to the one side of the second direction, relative to the first end portion of the first mounting portion. The other first stop may be positioned on the other side of the first direction and may project to the other side of the second direction, relative to the second end portion of the first mounting portion. The second stops may include one and the other second stops on the one and other sides, respectively, of the second direction. The one second stop may be positioned on the one side of the first direction and may project to the one side of the second direction, relative to the first end portion of the second mounting portion. The other second stop may be positioned on the one side of the first direction and may project to the other side of the second direction, relative to the second end portion of the second mounting portion.

The first attachment portion of the cover may include a pair of first legs extending from the cover body toward the circuit board, the first legs including one and the other first legs. The one and the other first legs may include one and the other first hooks, respectively. The one first hook may be generally of lateral U-shape projecting to the one side of the second direction, and the other first hook may be generally of lateral U-shape projecting to the other side of the second direction. The one first hook may be fittingly engaged with the first end portion of the first mounting portion of the circuit board and may abut the one first stop from the one side of the first direction. The other first hook may be fittingly engaged with the second end portion of the first mounting portion of the circuit board and may abut the other first stop from the one side of the first direction.

The second attachment portion of the cover may include a pair of second legs extending from the cover body toward the circuit board, the second legs including one and the other second legs. The one and the other second legs may include one and the other second hooks, respectively. The one second hook may be generally of lateral U-shape projecting to the one side of the second direction, and the other second hook may be generally of lateral U-shape projecting to the other side of the second direction. The one second hook may be fittingly engaged with the first end portion of the second mounting portion of the circuit board and may abut the one second stop from the other side of the first direction. The other second hook may be fittingly engaged with the second end portion of the second mounting portion of the circuit board and may abut the other second stop from the other side of the first direction.

The connection structure of an aspect of an optical fiber assembly and an electronic device of the invention includes the optical fiber assembly of any of the above aspects, and an electronic device. The first and second faces of the circuit board of the optical fiber assembly are the faces of the circuit board on one and the other sides, respectively, of a third direction. The third direction is the thickness direction of the circuit board of the optical fiber assembly.

The electronic device includes a connecting part and a host circuit board with the connecting part mounted thereon. The external connecting part of the optical fiber assembly is connected to the connecting part of the electronic device, with the external connecting part of the optical fiber assembly fitted in the connecting part of the electronic device from the one side of the third direction, or alternatively with the connecting part of the electronic device fitted in the external connecting part of the optical fiber assembly from the other side of the third direction.

Alternatively, the electronic device may further include an attachment portion. In this case, the external connecting part of the optical fiber assembly may be electrically connected to the connecting part of the electronic device, with at least one of the external connecting part and the circuit board of the optical fiber assembly fitted in the attachment portion of the electronic device from the one side of the third direction, or with the attachment portion of the electronic device fitted in the attachment hole of the circuit board of the optical fiber assembly from the other side of the third direction.

BRIEF DESCRIPTION OF DRAWINGS

The present invention can be even more fully understood with the reference to the accompanying drawings which are intended to illustrate, not limit, the present invention.

Figure 1A:
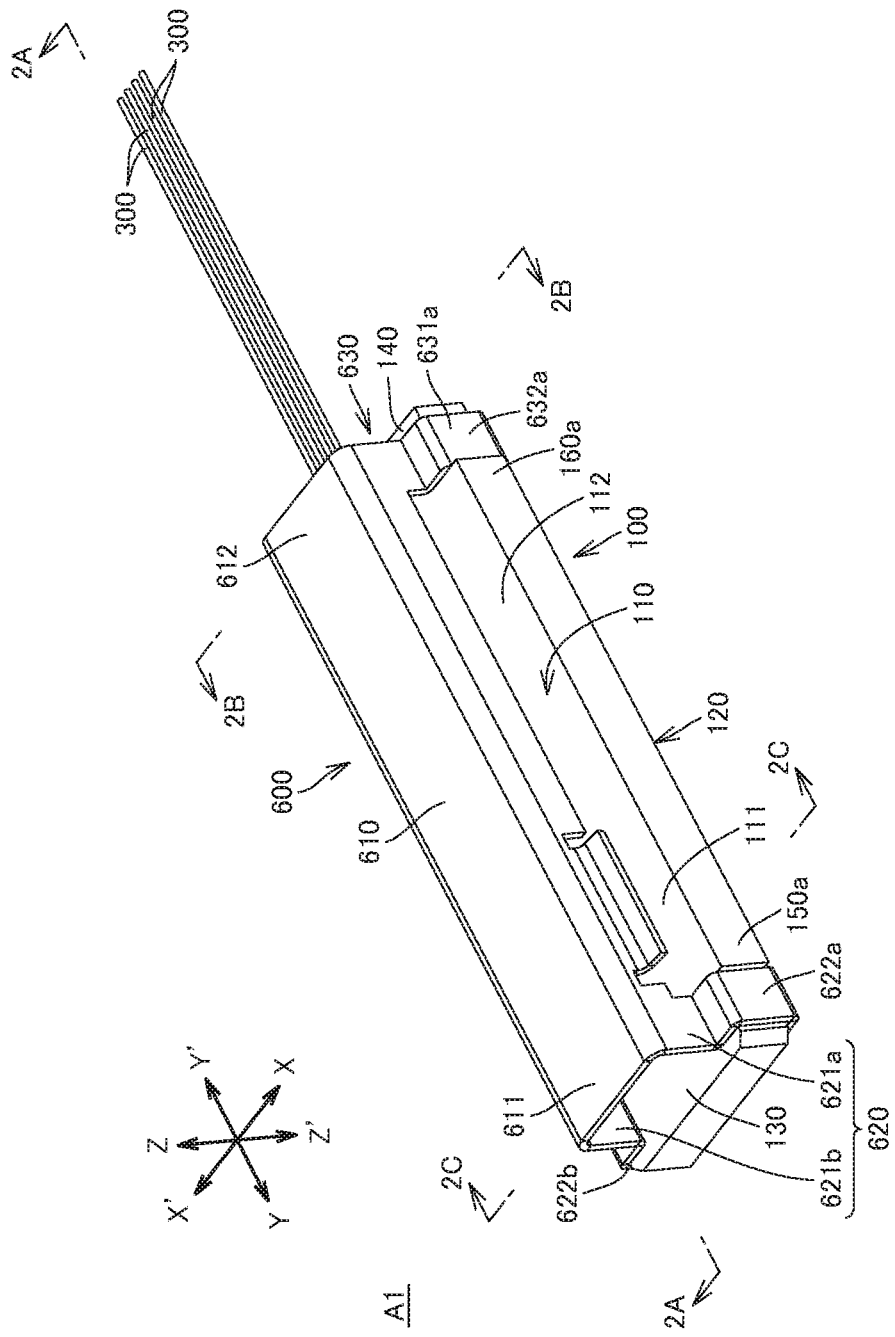
FIG. 1A is a front, top, and right-side perspective view of an optical fiber assembly according to a first embodiment of the invention.
Figure 1B:
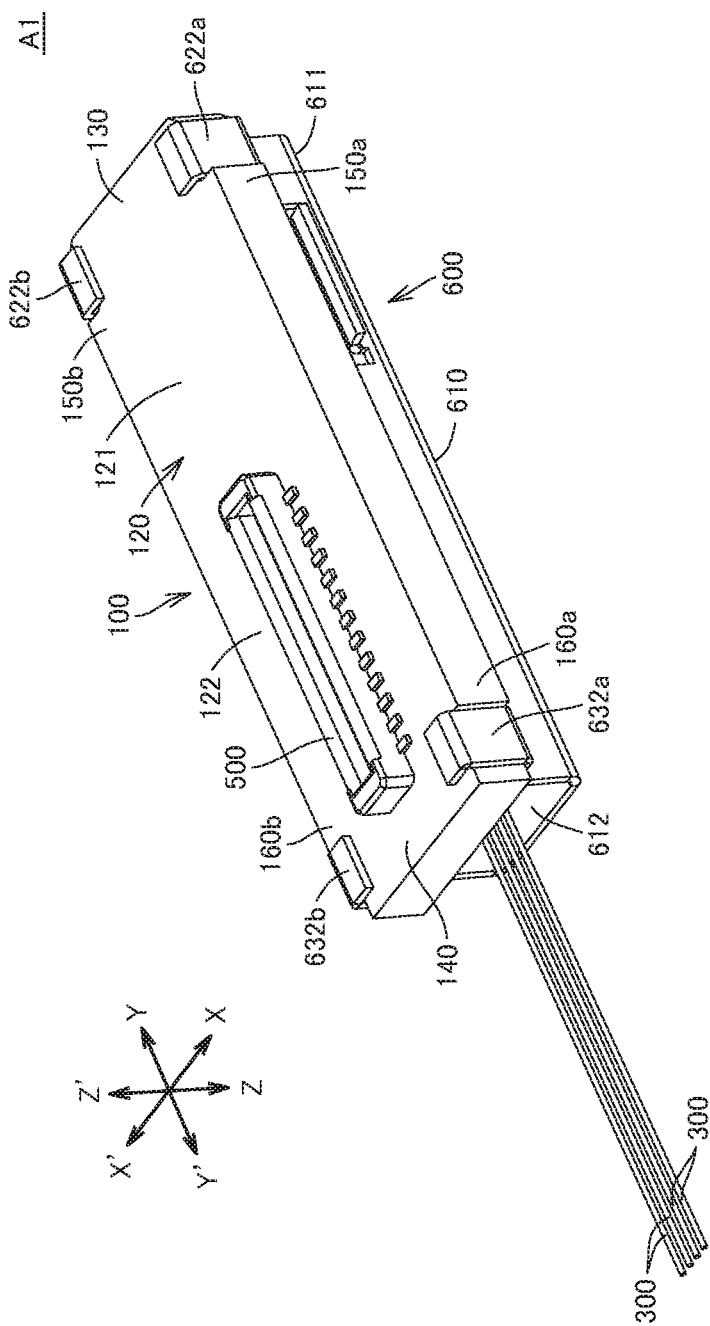
FIG. 1B is a back, bottom, and right-side perspective view of the assembly.

2A is a sectional view of the assembly, taken along line 2A-2A in FIG. 1A, with a host circuit board and a connector of an electronic device to be connected to the assembly illustrated by broken lines.

Figure 2A:
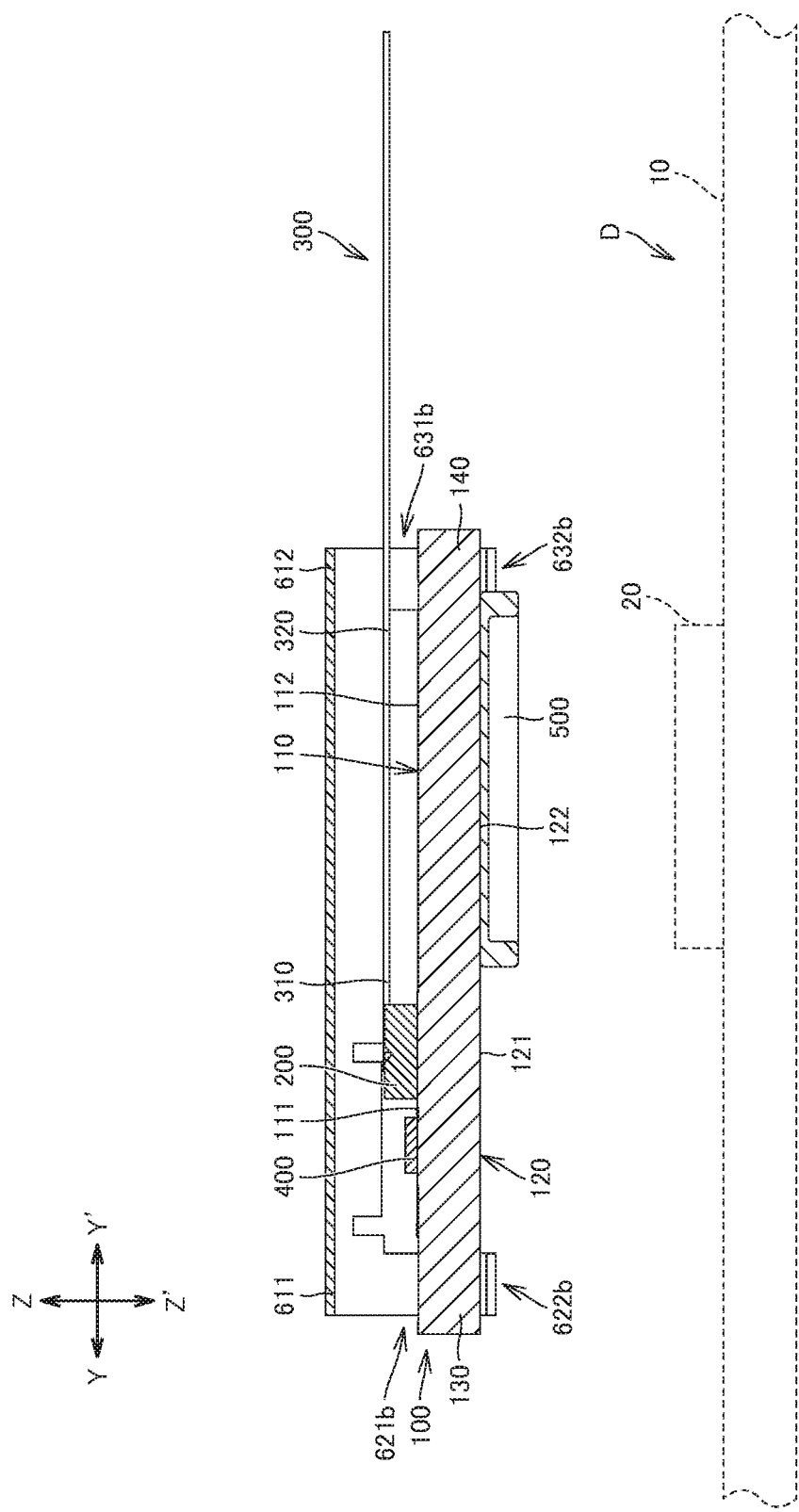
Figure 2B:
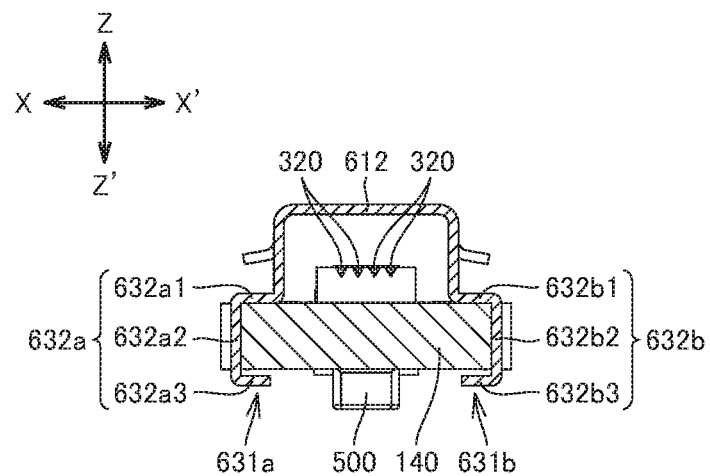

FIG. 2B is a sectional view of the assembly, taken along line 2B-2B in FIG. 1A.

Figure 2C:
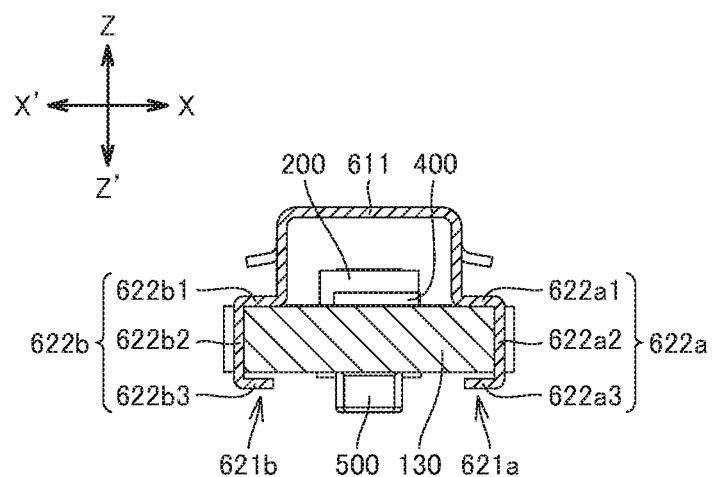

FIG. 2C is a sectional view of the assembly, taken along line 2C-2C in FIG. 1A.

Figure 3A:
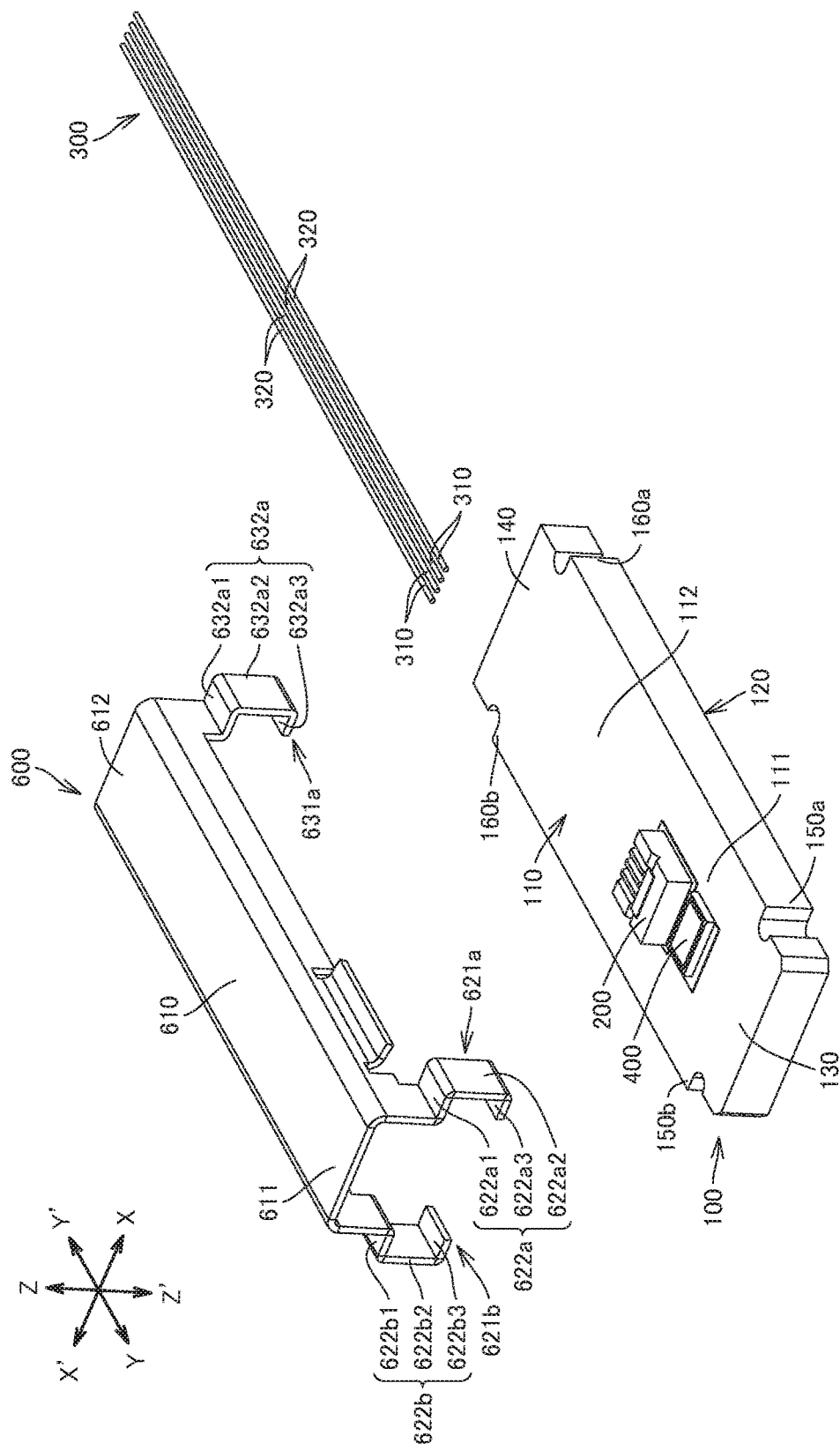

FIG. 3A is a front, top, and right-side perspective, exploded view of the assembly.

Figure 3B:
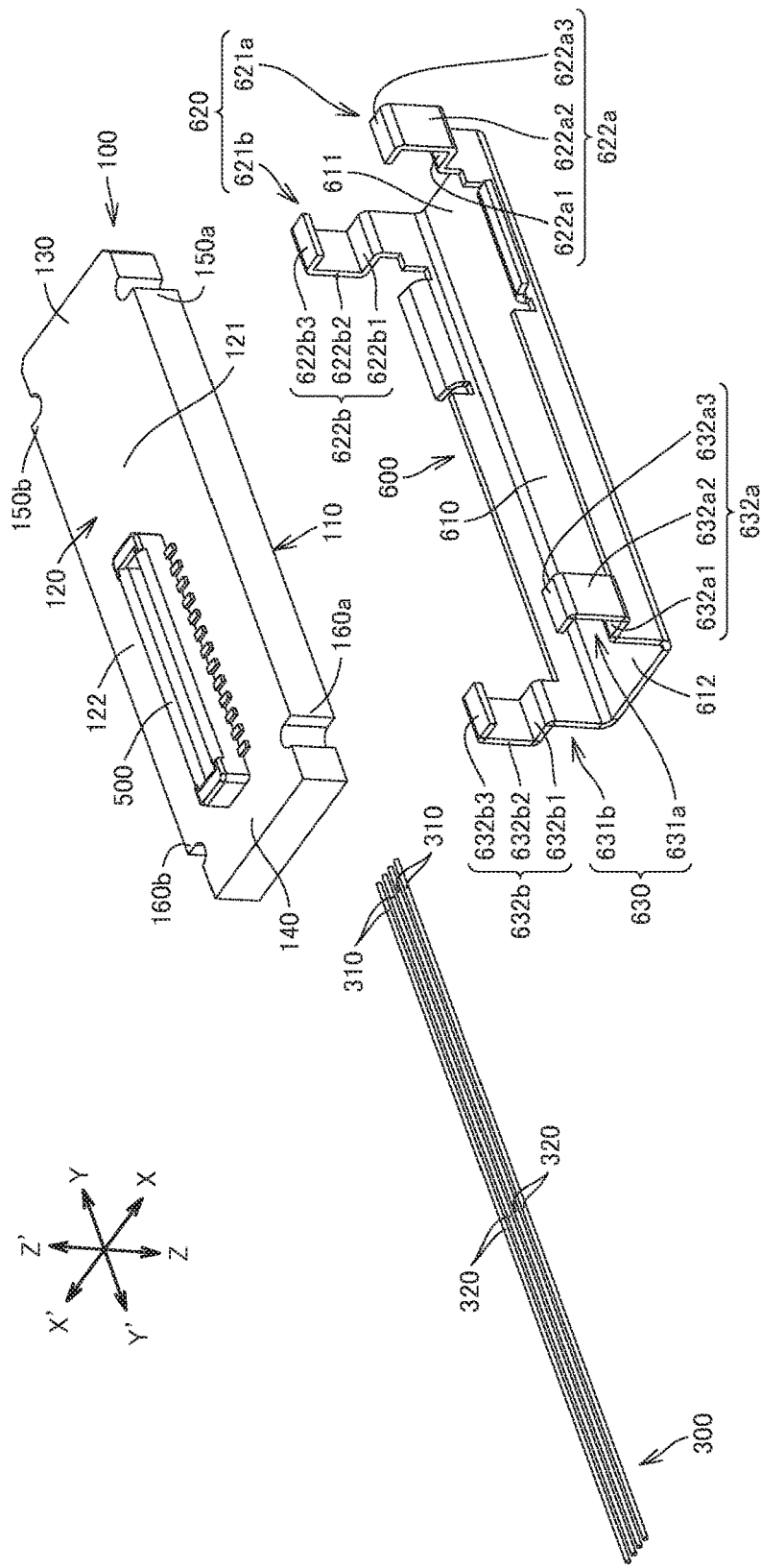

FIG. 3B is a back, bottom, and right-side perspective, exploded view of the assembly.

Figure 4:
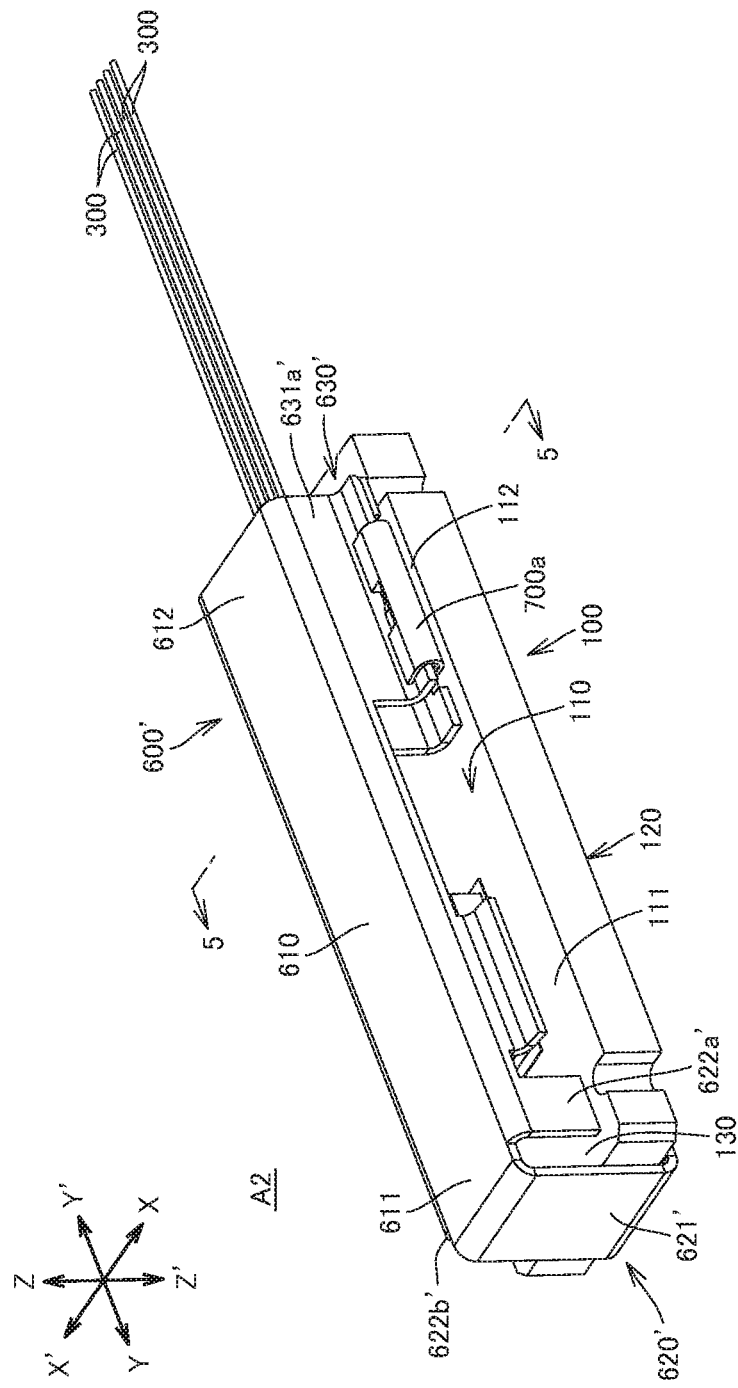

FIG. 4 is a front, top, and right-side perspective view of an optical fiber assembly according to a second embodiment of the invention.

Figure 5:
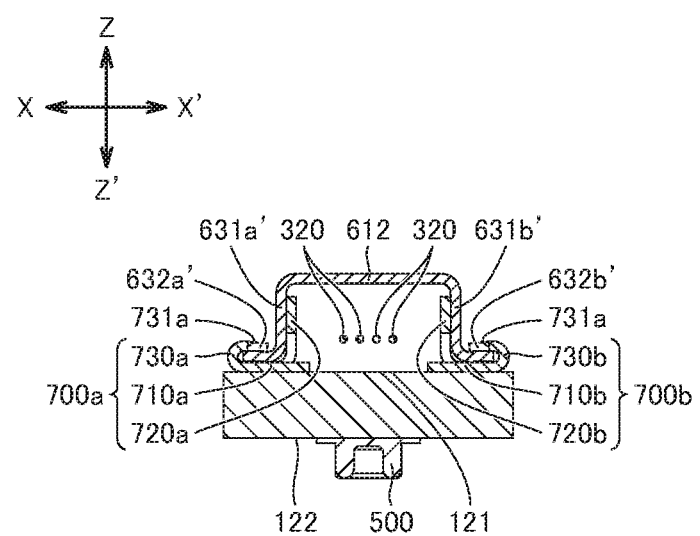

FIG. 5 is a sectional view of the assembly, taken along line 5-5 in FIG. 4A.

Figure 6:
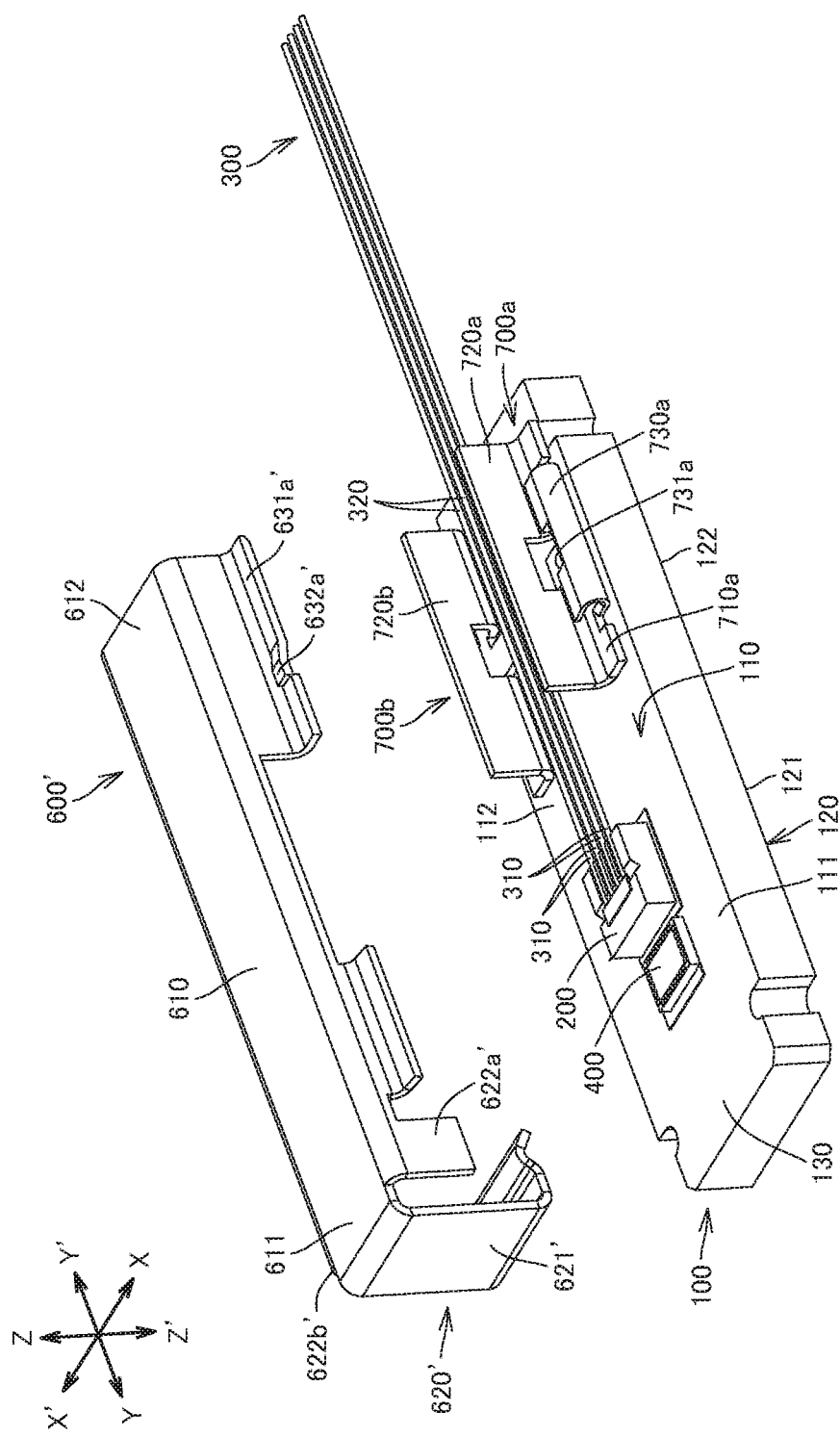

FIG. 6 is a front, top, and right-side perspective, exploded view of the assembly.

DESCRIPTION OF EMBODIMENTS

Various embodiments of the invention will now be described.

First Embodiment

An optical fiber assembly A1 (also referred to simply as an assembly A1) according to various embodiments including a first embodiment of the invention will be described with reference to FIGS. 1A to 3B. FIGS. 1A to 3B shows the assembly A1 of the first embodiment. FIGS. 1A to 2A, 3A and 3B indicate the Y-Y' direction, which is substantially parallel to a first face 110 of a circuit board 100 (to be described) of the assembly A1. The Y-Y' direction corresponds to the first direction in the Claims, in which the Y and Y' directions respectively correspond to one and the other sides of the first direction. FIGS. 1A, 1B, and 2B to 3B indicate the X-X' direction, which is orthogonal to the Y-Y' direction. The X-X' direction corresponds to the second direction in the Claims, in which the X and X' directions respectively correspond to one and the other sides of the second direction. FIGS. 1A to 3B indicate the Z-Z' direction, which is the thickness direction of the circuit board 100 of the assembly A1 and orthogonal to the Y-Y' and X-X' directions. The Z-Z' direction corresponds to the third direction in the Claims, in which the Z and Z' directions respectively correspond to one and the other sides of the third direction.

The assembly A1 includes the circuit board 100. The circuit board 100 has a first face 110 on the Z-direction side and a second face 120 on the Z'-direction side (opposite side to the first face 110). The first face 110 has a first region 111 and a second region 112, which are different regions from each other. The first region 111 may be, but is not required to be, positioned on the Y-direction side relative to the second region 112. The second face 120 has a third region 121 on the opposite side in the Z-Z' direction to the first region 111 and a fourth region 122 on the opposite side in the Z-Z'-direction to the second region 112.

The assembly A1 further includes at least one converter 200, at least one optical fiber 300, and at least one circuit 400. The or each converter 200 is an opto-electronic or electro-optic converter mounted on the first region 111 of the first face 110 of the circuit board 100. The or each converter 200 is optically connected to a first portion 310 of the corresponding optical fiber 300. An opto-electronic converter is a light-receiving element, such as a photodiode, configured to convert an optical signal incident from the first portion 310 of the optical fiber 300 into an electric signal and output the electric signal to a conductive line or bonding wire (not shown) of the circuit board 100. An electro-optic converter is a light-emitting element, such as a semiconductor laser or a light-emitting diode, configured to convert an electric signal received from the first conductive line or bonding wire of the circuit board 100 into an optical signal and emit the converted optical signal to the first portion 310 of the optical fiber 300.

The or each optical fiber 300 has the first portion 310, which is a leading end portion on the Y-direction side of the optical fiber 300. The first portion 310 of the or each optical fiber 300 is mechanically connected to the corresponding converter 200 or circuit board 100 so as to be optically connected to the corresponding converter 200 in one of the following manner (1) to (3), for example:

(1) The first portion 310 of the or each optical fiber 300 is fitted in (mechanically connected to) a connecting hole or recess of the corresponding converter 200 so as to face the converter 200 for optical connection therebetween.

(2) The first portion 310 of the or each optical fiber 300 is engaged with (mechanically connected to) an engagement piece provided on the circuit board 100 or is held by (mechanically connected to) a holding piece provided on the circuit board 100, so as to face the corresponding converter 200 for optical connection therebetween.

(3) The first portion 310 of the or each optical fiber 300 is fitted in (mechanically connected to) a connecting hole or recess of the corresponding converter 200 so as to be optically connected to the converter 200 via a mirror (not shown).

The or each optical fiber 300 further has a second portion 320. The second portion 320 may preferably, but is not required to, extend in Y' direction from the first portion 310 and across the second region 112 of the first face 110 of the circuit board 100. The second portion 320 of the or each optical fiber 300 may not extend across the second region 112 of the first face 110 of the circuit board 100.

The or each circuit 400 may preferably be an opto-electronic or electro-optical conversion circuit but may be a circuit of other kind. The or each circuit 400 is mounted on the first region 111 of the first face 110 of the circuit board 100. An opto-electronic conversion circuit is connected to the corresponding opto-electronic converter via the corresponding first conductive line or bonding wire of the circuit board 100. An opto-electronic conversion circuit is configured to perform predetermined processing on an electric signal converted from the optical signal by the corresponding opto-electronic converter. An electro-optic conversion circuit is connected to the corresponding electro-optic converter via the corresponding first conductive line or the bonding wire of the circuit board 100. An electro-optic conversion circuit is configured to receive an electric signal from the corresponding electro-optic conversion circuit, convert the signal into a kind that can be converted into an optical signal, and output the converted signal to the corresponding electro-optic converter, thereby allowing the electro-optic converter to emit an optical signal.

The assembly A1 may include a plurality of the converters 200, a plurality of the optical fibers 300, and a plurality of the circuit 400. It is preferable that the converters 200 be mounted, in a parallel arrangement along the X-X' direction, on the first region 111 of the first face 110 of the circuit board 100. The converters 200 may have one of the following configurations (1) to (3):

(1) All of the converters 200 are opto-electronic converters. In this case, all of the circuits 400 are opto-electronic conversion circuits.

(2) All of the converters 200 are electro-optical converters. In this case, all of the circuit units 400 are electro-optical conversion circuits.

(3) At least one of the converters 200 is an opto-electronic converter, and the rest is one or more electro-optical converters. In this case, at least one of the circuits 400 is an opto-electronic conversion circuit, and the rest is one or more electro-optical conversion circuits.

In any of the configuration (1) to (3), a plurality of the first conductive lines or bonding wires is provided, which respectively connect the converters 200 to the corresponding circuits 400. The converters 200 may be unitized as shown in FIG. 3A or may be incorporated into an IC chip.

Where a plurality of the optical fibers 300 is provided, at least the first portions 310 of the respective optical fibers 300 are disposed in a parallel arrangement along the X-X' direction (see FIG. 3A). The first portion 310 of each optical fiber 300 is mechanically connected to the corresponding converter 200 or circuit board 100 so as to be optically connected to the corresponding converter 200. The second portions 320 of the respective optical fibers 300 may also be disposed in a parallel arrangement along the X-X' direction.

The optical fibers 300 may be unitized in one of the followings manners (1) to (3):

(1) At least the first portions 310 of the optical fibers 300 are coated collectively with a plastic material.

(2) The portions other than the first portions 310 of the optical fibers 300 are coated collectively with a plastic material.

(3) The entire optical fibers 300 are coated collectively with a plastic material.

The assembly A1 further includes an external connecting part 500. The external connecting part 500 is a male or female connector and provided on the fourth region 122 of the second face 120 of the board 100. The external connecting part 500 is connected to the at least one circuit 400 via the circuit board 100.

The circuit board 100 further includes a first mounting portion 130 and a second mounting portion 140. The first mounting portion 130 is a portion of the circuit board 100 on its Y-direction side. For example, the first mounting portion 130 may be an end portion of the circuit board 100 on its Y-direction side as shown in FIGS. 1A to 3B, or may be a portion of the circuit board 100 on the Y'-direction side relative to the Y-direction-side end portion. The second mounting portion 140 is a portion of the circuit board 100 on the Y'-direction side relative to the first mounting portion 130 and the first region 111. The second mounting portion 140 may be an end portion of the circuit board 100 on its Y'-direction side as shown in FIGS. 1A to 3B or may be a portion of the circuit board 100 on the Y-direction side relative to the Y'-direction-side end portion. The first mounting portion 130 has a first end portion on the X-direction side and a second end portion on the X'-direction side. The second mounting portion 140 has a first end portion on the X-direction side and a second end portion on the X'-direction side.

The assembly A1 may further include a cover 600. The cover 600 has electrical conductivity. For example, the cover 600 may be made of a metal plate, or of a plastic material with a metal evaporated on its outer or inner surface. The cover 600 is fixed to the circuit board 100 to cover the at least one converter 200, the first portion 310 of the or each optical fiber 300, and the at least one circuit 400 from the Z-direction side, without contacting the at least one converter 200, the at least one optical fiber 300, or the at least one circuit 400.

The cover 600 includes a cover body 610, a first attachment portion 620, and a second attachment portion 630. The cover body 610 may be a flat plate (not shown) or a plate generally of an inverted U-shaped cross-section taken along the Z-Z' direction (see FIGS. 2B and 2C). The cover body 610 covers, from the Z-direction side, the first region 111 and the second region 112 of the first face 110 of the circuit board 100, as well as the at least one converter 200, the first portion of the or each optical fiber 300, and the at least one circuit 400, without contacting the at least one converter 200, the at least one optical fiber 300, or the at least one circuit 400. The cover body 610 includes a first cover portion 611 and a second cover portion 612. The first cover portion 611 covers the first region 111 of the first face 110 of the circuit board 100, the at least one converter 200, the first portion of the or each optical fiber 300, and the at least one circuit 400 from the Z-direction side, without contacting the at least one converter 200, the first portion of the or each optical fiber 300, or the at least one circuit 400. The second cover portion 612 covers the second region 112 of the first face 110 of the circuit board 100 from the Z-direction side. Where the second portion 320 of the or each optical fiber 300 extends across the second region 112, the second cover portion 612 also covers the second portion 320 of the or each optical fiber 300 from the Z-direction side, without contacting the at least one converter 200, the first portion of the or each optical fiber 300, the second portion of the or each optical fiber 300, or the at least one circuit 400.

The first attachment portion 620 includes a pair of first legs 621a and 621b (which respectively correspond to one and the other first legs in the Claims). The first leg 621a extends from the end on the X-direction side of the first cover portion 611 of the cover body 610 toward the circuit board 100 and is fixed directly to the first mounting portion 130 of the circuit board 100. The first leg 621b extends from the end on the X'-direction side of the first cover portion 611 of the cover body 610 toward the circuit board 100 and is fixed directly to the first mounting portion 130 of the circuit board 100. More specifically, the first legs 621a and 621b may preferably, but are not required to, have one of the following configurations (a) to (d) for direct attachment to the first mounting portion 130 of the circuit board 100. In any aspect, the first legs 621a and 621b are not in contact with the at least one converter 200, the first portion of the or each optical fiber 300, or the at least one circuit 400.

Configuration (a): As shown, the first leg 621a includes a first hook 622a generally of a laterally-oriented U-shape projecting in the X-direction (which corresponds to one of the first hooks in the Claims), and the first leg 621b includes a first hook 622b generally of a laterally-oriented U-shape projecting in the X'-direction (which corresponds to the other first hook in the Claims). The first hook 622a fittingly receives the first end portion of the first mounting portion 130 of the circuit board 100 from the X'-direction side, and the first hook 622b fittingly receives the second end portion of the first mounting portion 130 of the circuit board 100 from the X-direction side. The first hooks 622a and 622b are more specifically configured as follows. The first hook 622a includes a first portion 622a1, a second portion 622a2, and a third portion 622a3. The first portion 622a1 extends in the X direction along, and in contact with, the Z-direction-side face of the first end portion of the first mounting portion 130 of the circuit board 100 (a part of the first face 110). The second portion 622a2 extends in the Z' direction from the X-direction end of the first portion 622a1. The second portion 622a2 may or may not be in contact with the X-direction-side face of the first end portion of the first mounting portion 130. The third portion 622a3 extends in the X' direction from the Z'-direction end of the second portion 622a2 along, and in contact with, the Z'-direction-side face (a part of the second face 120) of the first end portion of the first mounting portion 130 of the circuit board 100. The first hook 622b includes a first portion 622b1, a second portion 622b2, and a third portion 622b3. The first portion 622b1 extends in the X direction along, and in contact with, the Z-direction-side face of the second end portion of the first mounting portion 130 of the circuit board 100 (a part of the first face 110). The second portion 622b2 extends in the Z' direction from the X'-direction end of the first portion 622b1. The second portion 622b2 may or may not be in contact with an X'-direction-side face of the second end portion of the first mounting portion 130. The third portion 622b3 extends in the X direction from the Z'-direction end of the second portion 622b2 along, and in contact with, the Z'-direction-side face (a part of the second face 120) of the second end portion of the first mounting portion 130 of the circuit board 100. In the state before attachment to the first mounting portion 130 of the circuit board 100, the first attachment portion 620 of the cover 600 may preferably be configured such that the third portions 622a3 and 622b3 of the first hooks 622a and 622b of the first legs 621a and 621b extend in the Z' direction. The first attachment portion 620 may be attached to the first mounting portion 130 by bringing the first portions 622a1 and 622b1 of the first hooks 622a and 622b of the first legs 621a and 621b into contact with the corresponding Z-direction-side faces of the first and second end portions of first attachment portion 620, placing the second portions 622a2 and 622b2 of the first hooks 622a and 622b respectively along the X- and X'-direction-side faces of the first and second end portions of the first attachment portion 620, bending the third portions 622a3 and 622b3 of the first hook 622a and 622b and bringing them into contact respectively with the Z'-direction-side faces of the first and second end portions of the first attachment portion 620.

Configuration (b): The first legs 621a and 621b include respective first hooks of similar configuration to the first hooks 622a and 622b in configuration (a) above, and the first hooks can be attached to the first mounting portion 130 of the circuit board 100 in a similar manner. The differences are that the first hooks in this configuration are generally of a laterally-oriented U-shape projecting in the Y direction, and fittingly receive the first and second end portions of the first mounting portion 130 of the circuit board 100 from Y' direction.

Configuration (c): The first leg 621a is fitted, from the Z-direction side, in an engagement hole or recess in the first end portion of the first mounting portion 130 of the circuit board 100. The first leg 621b is fitted, from the Z-direction side, in an engagement hole or recess in the second end portion of the first mounting portion 130. The first legs 621a and 621b may each have an engaging claw or protrusion for engagement with a wall of the engagement hole or recess.

Configuration (d): The first legs 621a and 621b are provided with respective engagement holes to fittingly receive corresponding engaging protrusions. The engaging protrusions are provided on the respective end faces of the first and second end portions of the first mounting portion 130 of the circuit board 100 (e.g., the end face on the X-direction side of the first end portion and the end face on the X'-direction side of the second end portion, or alternatively the end faces on the Y-direction side of the first and second end portions). With the engaging protrusions fitting in the engagement holes, the first legs 621a and 621b are in contact with the corresponding end faces of the first and second end portions of the first mounting portion 130. This configuration may be modified such that the engagement holes are provided in the respective end faces of the first and second end portions of the first mounting portion 130, and the engaging protrusions are provided at the respective first legs 621a and 621b. With regard to the first legs 621a and 621b, any variation of configuration (d) may be combined with configuration (a) or (b) above.

The second attachment portion 630 includes a pair of second legs 631a and 631b (which respectively correspond to one and the other second legs in the Claims). The second leg 631a from the end on the X-direction side of the second cover portion 612 of the cover body 610 toward the circuit board 100 and is fixed directly to the second mounting portion 140 of the circuit board 100.

The second leg 631b extends from the end on the X'-direction side of the second cover portion 612 of the cover body 610 toward the circuit board 100 and is fixed directly to the second mounting portion 140 of the circuit board 100. More specifically, the second legs 631a and 631b may preferably, but are not required to, have one of the following configurations (a) to (d) for direct attachment to the second mounting portion 140 of the circuit board 100. In any aspect, the second legs 631a and 631b are not in contact with the at least one converter 200, the first portion of the or each optical fiber 300, the second portion 320 of the or each optical fiber 300, or the at least one circuit 400. Also, where the second portion 320 of the optical fiber 300 extend across the second region 112, the second legs 631a and 631b are respectively positioned on the X- and X'-direction sides of the second portion 320 of the or each optical fiber 300 (on opposite sides of the second portion 320), without contacting the second portion 320 of the or each optical fiber 300.

Configuration (a): The second legs 631a and 631b may have a similar configuration to configuration (a) of the first legs 621a and 621b and may be attached to the second mounting portion 140 in a similar manner to the attachment of the first legs 621a and 621b. More specifically, the second leg 631a includes a second hook 632a generally of a laterally-oriented U-shape projecting in the X-direction (which corresponds to one of the second hooks in the Claims), and the second hook 632a fittingly receives the first end portion of the second mounting portion 140 of the circuit board 100 from the X'-direction side. The second leg 631b includes a second hook 632b generally of a laterally-oriented U-shape projecting in the X'-direction (which corresponds to the other second hook in the Claims), and the second hook 632b fittingly receives the second end portion of the second mounting portion 140 of the circuit board 100 from the X-direction side. The first portion 632a1 of the second hook 632a extends in the X direction along, and in contact with, the Z-direction-side face (a part of the first face 110) of the first end portion of the second mounting portion 140 of the circuit board 100. The second portion 632a2 of the second hook 632a extends in the Z' direction from the X-direction end of the first portion 632a1. The second portion 632a2 may or may not be in contact with the X-direction-side face of the first end portion of the second mounting portion 140. The third portion 632a3 of the second hook 632a extends in the X' direction from the Z'-direction end of the second portion 632a2 along, and in contact with, the Z'-direction-side face (a part of the second face 120) of the first end portion of the second mounting portion 140 of the circuit board 100. The first portion 632b1 of the second hook 632b extends in the X' direction along, and in contact with, the Z-direction-side face (a part of the first face 110) of the second end portion of the second mounting portion 140 of the circuit board 100. The second portion 632b2 of the second hook 632a extends in the Z' direction from the X'-direction end of the first portion 632b1. The second portion 632b2 may or may not be in contact with the X'-direction-side face of the second end portion of the second mounting portion 140. The third portion 632b3 of the second hook 632b extends in the X direction from the Z'-direction end of the second portion 632b2 along, and in contact with, the Z'-direction-side face (a part of the second face 120) of the second end portion of the second mounting portion 140 of the circuit board 100.

Configuration (b): The second legs 631a and 631b may be symmetrical in the Y-Y' direction to the first legs 621a and 621b of configuration (b). Particularly, the second legs 631a and 631b include respective first hooks of a laterally-oriented U-shape projecting in the Y' direction, and fittingly receive the first and second end portions of the second mounting portion 140 of the circuit board 100 from the Y direction.

Configuration (c): The second legs 631a and 631b may have a similar configuration to configuration (c) of the first legs 621a and 621b. Particularly, the second legs 631a and 631b are fitted, from the Z-direction side, in respective engagement holes or recesses in the first and second end portions of the second mounting portion 140 of the board 100.

Configuration (d): The second legs 631a and 631b may have a similar configuration to configuration (d) of the first legs 621a and 621b. Particularly, the engagement holes of the second legs 631a and 631b fittingly receive the engaging protrusions, which are provided on respective end faces of the first and second end portions of the second mounting portion 140 of the circuit board 100 (e.g., the end face on the X-direction side of the first end portion and the end face on the X'-direction side of the second end portion, or alternatively the end faces on the Y'-direction side of the first and second end portions). With the engaging protrusions fitting in the engagement holes, the second legs 631a and 631b are in contact with the corresponding end faces of the first and second end portions of the second mounting portion 140. This configuration may be modified such that the engagement holes are provided in the respective end faces of the first and second end portions of the second mounting portion 140, and the engaging protrusions are provided at the respective second legs 631a and 631b. With regard to the second legs 631a and 631b, any variation of configuration (d) may be combined with configuration (a) or (b) above.

In the assembly A1, the second cover portion 612 and the second attachment portion 630 of the cover 600 of any of the above aspects constitute the pressable part in the Claims. The second cover portion 612 corresponds to the cover portion of the pressable part in the Claims.

Where the first attachment portion 620 and the second attachment portion 630 have the corresponding configuration (a) above, the circuit board 100 may further include a pair of first stops 150a and 150b (corresponding to one and the other first stops in the Claims), and a pair of second stops 160a and 160b (corresponding to one and the other second stops in the Claims).

The first stop 150a is provided at an end portion on the X-direction side of the circuit board 100 and positioned on the Y'-direction side relative to the first end portion of the first mounting portion 130. The first stop 150b is provided at an end portion on the X'-direction side of the circuit board 100 and positioned on the Y'-direction side relative to the second end portion of the first mounting portion 130. The second stop 160a is provided at an end portion on the X-direction side of the circuit board 100 and positioned on the Y-direction side relative to the first end portion of the second mounting portion 140. The second stop 160b is provided at an end portion on the X'-direction side of the circuit board 100 and positioned on the Y-direction side relative to the second end portion of the second mounting portion 140. The first stops 150a and 150b and the second stops 160a and 160b further have the following configuration (1) or (2).

(1) Where the circuit board 100 has an intermediate portion between the first mounting portion 130 and the second mounting portion 140 as shown in FIGS. 1A to 3B, the intermediate portion is larger in dimension in the X-X' direction than the first mounting portion 130 and then the second mounting portion 140. Also, the intermediate portion has a dimension in the Y-Y' direction that is substantially equal to each distance in the Y-Y' direction from the first hook 622a of the first leg 621a to the second hook 632a of the second leg 631a, as well as from the first hook 622b of the first leg 621b to the second hook 632b of the second leg 631b. In the intermediate portion having such dimensions, the corner in the Y- and X-direction side serves as the first stop 150a; the corner in the Y- and X'-direction side serves as the first stop 150b; the corner in the Y'- and X-direction side serves as the second stop 160a; and the corner in the Y'- and X'-direction side serves as the second stop 160b. The first stop 150a projects further in the X direction than the first end portion of the first mounting portion 130; the first stop 150b projects further in the X' direction than the second end portion of the first mounting portion 130; the second stop 160a projects further in the X direction than the first end portion of the second mounting portion 140; and the second stop 160b projects further in the X' direction than the second end portion of the second mounting portion 140.

(2) Each stop may be configured as follows: the first stop 150a is a protrusion projecting further in the X direction than the first end portion of the first mounting portion 130; the first stop 150b is a protrusion projecting further in the X' direction than the second end portion of the first mounting portion 130; the second stop 160a is a protrusion projecting further in the X direction than the first end portion of the second mounting portion 140; and the second stop 160b is a protrusion projecting further in the X' direction than the second end portion of the second mounting portion 140.

The first stops 150a and 150b of any of the above aspects are abutted, from the Y-direction side, respectively by the first hooks 622a and 622b of the first legs 621a and 621b of the first attachment portion 620. The second stops 160a and 160b of any of the above aspects are abutted, from the Y'-direction side, respectively by the second hooks 632a and 632b of the second legs 631a and 631b of the second attachment portion 630.

The following is a description of steps for connecting the above-described assembly A1 to a host circuit board 10 of an electronic device D. A connecting part 20 is pre-mounted on the host circuit board 10. Where the external connecting part 500 is a male connector, the connecting part 20 is a female connector, or vice versa. FIG. 2A shows the host circuit board 10 and the connecting part 20 of the electronic device D by broken lines. First, the assembly A1 is brought relatively closer in Z-Z' direction to the host circuit board 10 of the electronic device D to align the external connecting part 500 of the assembly A1 with the connecting part 20 of the electronic device D. In this state, the pressable part of the assembly A1 is pressed in the Z' direction (subjected to a load in the Z' direction) to press-fit the external connecting part 500 to the connecting part 20. More particularly, where the external connecting part 500 is a male connector and the connecting part 20 is a female connector, the external connecting part 500 fits in the connecting part 20. Where the external connecting part 500 is a female connector and the connecting part 20 is a male connector, the connecting part 20 fits in the external connecting part 500. The external connecting part 500 and the connecting part 20 are thus connected together, thereby forming the connection structure of the assembly A1 and the electronic device D.

The assembly A1 as described above provides technical features and effects (1) to (6) as follows.

(1) When the pressable part (the second cover portion 612 and the second attachment portion 630) of the assembly A1 is pressed (subjected to a load) in the Z' direction in order to connect the external connecting part 500 of the assembly A1 to the connecting part 20 of the electronic device D (this may be herein referred to as "at the time of connection"), the load applied on the pressable part of the assembly A1 will not be transferred to the at least one converter 200, the first portion 310 of the or each optical fiber 300, or the at least one circuit 400. This is because the at least one converter 200, the first portion 310 of the or each optical fiber 300, or the at least one circuit 400 are placed on the first region 111 of the circuit board 100 and are not in contact with the pressable part (the second cover portion 612 and the second attachment portion 630).

(2) Where the second portion 320 of the or each optical fiber 300 extends across the second region 112 of the circuit board 100, the pressable part of the assembly A1 covers the second portion 320 of the or each optical fiber 300 without contacting the second portion 320. This arrangement makes it possible to press the pressable part without applying a load onto the second portion 320 at the time of connection.

(3) The manufacture of the assembly A1 is flexible for the following reasons. The third region 121 of the second face 120 of the circuit board 100 is an empty region, which can be placed on a workbench, before or after mounting the external connecting part 500 on the fourth region 122 of the second face 120 of the circuit board 100, in order to mount the at least one converter 200 and the at least one circuit 400 onto the first region 111 of the first face 110 of the circuit board 100. Further, where the at least one circuit 400 is connected to the circuit board 100 by wire bonding, it is easy conduct the wire bonding process because the third region 121 of the circuit board 100 can be heated from the Z'-direction side using a heater.

(4) The assembly A1 is configured such as to reduce displacement of the cover 600 in the Y-Y' direction relative to the circuit board 100 in an aspect of the assembly A1 where the first attachment portion 620 and the second attachment portion 630 of the cover 600 each have configuration (a) described above and where the circuit board 100 includes the first stops 150a and 150b and the second stops 160a and 160b. This is because the first legs 621a and 621b of the first attachment portion 620 of the cover 600 abut the first stops 150a and 150b, respectively, from the Y-direction side, and the second legs 631a and 631b of the second attachment portion 630 of the cover 600 abut the second stops 160a and 160b, respectively, from the Y'-direction side. Also in an aspect of the assembly A1 where the first attachment portion 620 and the second attachment portion 630 of the cover 600 each have one of configurations (b) to (d) described above, the assembly A1 is configured such as to reduce displacement of the cover 600 in the Y-Y' direction relative to the circuit board 100. This is because the first attachment portion 620 is fixed to the first mounting portion 130 of the circuit board 100, and the second attachment portion 630 is fixed to the second mounting portion 140 of the circuit board 100. The assembly A1 of either of these aspects is suitable for combination with a tubular plastic bushing (not shown). Particularly, when the circuit board 100 and the cover 600 of the assembly A1 are inserted through the bushing such that the bushing accommodates a portion of the at least one optical fiber 300 on the Y'-direction side relative to the second portion 320, the bushing is brought into contact with the cover 600 to prevent displacement of the cover 600 in the Y-Y' direction.

(5) The assembly A1 has improve EMC characteristics because the cover 600 covers the at least one converter 200, the first portion 310 of the or each optical fiber 300, and the at least one circuit 400. Also, the cover 600 includes the pressable part, making it possible to minimize the number of components for the assembly A1.

(6) Where the second portion 320 of the at least one optical fiber 300 extends across the second region 112 of the circuit board 100, the second region 112 is effectively utilized as the region across which the second portion 320 extends. The assembly A1 is accordingly downsized.

Second Embodiment

An optical fiber assembly A2 (also referred to simply as an assembly A2) according to various embodiments including a second embodiment of the invention will be described with reference to FIGS. 4 to 6. FIGS. 4 to 6 shows the assembly A2 of the second embodiment. The Y-Y' direction indicated in FIGS. 4 and 6 is defined in a similar manner to that of the assembly A1. The X-X' and Z-Z' directions indicated in FIGS. 4 to 6 are defined in a similar manner to those of the assembly A1.

The assembly A2 has the same configuration as the assembly A1, except for the following points. Difference (1): the assembly A2 includes a cover 600' that has a different configuration from that of the cover 600 of the assembly A1. Difference (2): the assembly A2 further includes fixed parts 700a and 700b. Difference (3): In the assembly A2, the second mounting portion of the circuit board 100 has a different configuration from that of the second mounting portion 140 of the circuit board 100 of the assembly A1.

The first mounting portion 130 of the circuit board 100 is an end portion on the Y-direction side of the circuit board 100. The second region 112 of the circuit board 100 has a portion that serves as the second mounting portion.

The fixed parts 700a and 700b each are made of metal, plastic, or other material and fixed to the second region 112 of the first face 110 of the circuit board 100, without contacting the at least one converter 200, the at least one optical fiber 300, or the at least one circuit 400. The fixed parts 700a and 700b may respectively include bases 710a and 710b and fixed part bodies 720a and 720b extending therefrom in the Z direction. The bases 710a and 710b each may be fixed to the above portion of the second region 112 (the second mounting portion) of the circuit board 100 in one of the following manners (1) to (3), for example:

(1) The bases 710a and 710b are soldered to respective electrodes on the second region 112 of the circuit board 100.

(2) The bases 710a and 710b are bonded to the second region 112 of the circuit board 100.

(3) The bases 710a and 710b are fitted in respective fitting holes (not shown) in the second region 112 of the circuit board 100.

The fixed part bodies 720a and 720b are positioned on the second region 112 of the first face 110 of the circuit board 100, without contacting the at least one converter 200, the at least one optical fiber 300, or the at least one circuit 400. Where the second portion 320 of the or each optical fiber 300 extends across the second region 112, the fixed part bodies 720a and 720b are disposed respectively on the X- and X'-direction sides relative to the second portion 320 of the or each optical fiber 300, without contacting the second portion 320 of the or each optical fiber 300.

The cover 600' includes a cover body 610, a first attachment portion 620', and a second attachment portion 630'. The first attachment portion 620' includes a hook 621' and a pair of abutments 622a' and 622b'. The hook 621' is generally L-shaped in side view and extends from the Y-direction end of the first cover portion 611 of the cover body 610 toward the circuit board 100. The hook 621' is in contact with the Y- and Z'-direction-side faces of the first mounting portion 130 of the circuit board 100, without contacting the at least one converter 200, the at least one optical fiber 300, or the at least one circuit 400. The abutments 622a' and 622b' extend from the X- and X'-direction ends, respectively, of the first cover portion 611 of the cover body 610 toward the circuit board 100 and are in contact with the respective Z-direction-side faces of the first and second end portions of the first mounting portion 130 of the circuit board 100, without contacting the at least one converter 200, the at least one optical fiber 300, or the at least one circuit 400. In short, the first mounting portion 130 of the circuit board 100 is held in the Z-Z' direction by and between the hook 621' and the abutments 622a' and 622b', so that the hook 621' restricts displacement of the first mounting portion 130 in the Y direction.

The second attachment portion 630' includes a pair of second legs 631a' and 631b'. The second legs 631a' and 631b' extend respectively from the X- and X'-direction ends of the second cover portion 612 of the cover body 610 toward the circuit board 100 and are fixed to the respective fixed part bodies 720a and 720b of the fixed parts 700a and 700b, without contacting the at least one converter 200, the at least one optical fiber 300, or the at least one circuit 400. Specifically, the second legs 631a' and 631b' may preferably, but are not required to, have one of the following configurations (a) or (b) for direct attachment to the respective fixed part bodies 720a and 720b.

(a) The fixed parts 700a and 700b are symmetrical to each other in the X-X' direction and further included respective guides 730a and 730b. The bases 710a and 710b of the fixed parts 700a and 700b are fixed on the second region 112 of the circuit board 100 in the manner (1) described above. The fixed part body 720a is fixed to one of the X- and X'-direction ends of the base 710a, and the guide 730a is provided at the other end of the base 710a. Likewise, the fixed part body 720b is fixed to one of the X- and X'-direction ends of the base 710b, and the guide 730b is provided at the other end of the base 710b. The guides 730a and 730b are generally of lateral U-shape in cross-section taken along the Z-Z' direction. The second legs 631a' and 631b' are symmetrical to each other in the X-X' direction and are generally of L-shape in cross-section taken along the Z-Z' direction. The second leg 631a' include an abutment, which is in contact with the fixed part body 720a from outside, and a runner, which is received in the guide 730a such as to be movable in the Y-Y' direction. One of the runner of the second leg 631a' and the guide 730a is provided with an engaging protrusion, and the other is provided with an engaging hole to be engaged with the engaging protrusion. Likewise, the second leg 631b' include an abutment, which is in contact with the fixed part body 720b from outside, and a runner, which is received in the guide 730b such as to be movable in the Y-Y' direction. One of the runner of the second leg 631b' and the guide 730b is provided with an engaging hole, and the other is provided with an engaging protrusion to be engaged with the engaging hole. In an embodiment shown in FIGS. 4 to 6, the runner of the second leg 631a' is provided with an engaging protrusion 632a', which is fittingly engaged in an engaging hole 731a in the guide 730a, and the runner of the second leg 631b' is provided with an engaging protrusion 632b', which is fittingly engaged in an engaging hole 731b in the guide 730b. In another embodiment, the fixed parts 700a and 700b may each be provided with a runner, the second legs 631a' and 631b' may each be provided with a guide for guiding the corresponding runner.

(b) The second legs 631a' and 631b' abut the respective fixed part bodies 720a and 720b of the fixed parts 700a and 700b from outside or inside. One of the second leg 631a' and the fixed part body 720a of the fixed part 700a is provided with an engaging hole, and the other is provided with an engaging protrusion to be engaged with the engaging hole. Likewise, one of the second leg 631b' and the fixed part body 720b of the fixed part 700b is provided with an engaging hole, and the other is provided with an engaging protrusion to be engaged with the engaging hole.

The second legs 631a' and 631b' of any configuration described above are indirectly fixed to the second region 112 of the circuit board 100 via the corresponding fixed parts 700a and 700b.

In the assembly A2, the second cover portion 612 and the second attachment portion 630' of the cover 600' of any of the above aspects constitute the pressable part in the Claims. The second cover portion 612 of the assembly A2 also corresponds to the cover portion of the pressable part in the Claims.

As with the assembly A1, the assembly A2 described above is connected to a host circuit board 10 of an electronic device D to form a connection structure of the assembly A2 and the electronic device D. FIG. 2A should be referred to for illustration of the host circuit board 10 and the connecting part 20 of the electronic device D. The assembly A2 described above provides technical features and effects similar to technical features and effects (1) to (3), (5) and (6) of the assembly A1 and also the following technical features and effects.

In an aspect where the second portion 320 of the or each optical fiber 300 extends across the second region 112 of the circuit board 100, when the second legs 631a' and 631b' of the second attachment portion 630' of the cover 600' are fixed to the respective fixed parts 700a and 700b, the second legs 631a' and 631b' are unlikely to contact the second portion 320 of the or each optical fiber 300. This is because the second portion(s) 320 of the optical fiber(s) 300 is located between the fixed part bodies 720a and 720b of the fixed parts 700a and 700b, and the second legs 631a' and 631b' are in abutment from outside with, and are fixed to, the respective fixed part bodies 720a and 720b.

It is also possible to restrict displacement of the cover 600' of the assembly A2 in the Y-Y' direction relative to the circuit board 100. This is because the hook 621' of the first attachment portion 620' abuts the Y- and Z'-direction-side faces of the first mounting portion 130 of the circuit board 100, and the second legs 631a' and 631b' of the second attachment portion 630' are fixed to the respective fixed part bodies 720a and 720b of the fixed parts 700a and 700b. Therefore, the assembly A2 is suitable for combination with a tubular plastic bushing (not shown). Particularly, when the circuit board 100 and the cover 600' of the assembly A2 are inserted through the bushing, the bushing is brought into contact with the cover 600' to prevent displacement of the cover 600' in the Y-Y' direction.

The optical fiber assemblies and connection structures describe above are not limited to the above-described embodiments but can be modified in any manner within the scope of the claims. Modification examples will be described below.

The first attachment portion of the cover of the invention, if provided, may be fixed directly or indirectly to the first mounting portion of the circuit board. The second attachment portion of the cover of the invention may be fixed directly or indirectly to the second mounting portion of the circuit board. The first attachment portion 620 of the assembly A1 and the first attachment portion 620' of the assembly A2 are interchangeable. The first attachment portion of each of the assemblies A1 and A2 may have a similar configuration to that of the second attachment portion 630' of the assembly A2 of any of the above aspects, in which case the first attachment portion may be attached to the first mounting portion of the circuit board 100 via the corresponding fixed part 700a or 700b of any of the above aspects. The cover can be omitted in the invention. In this case, the first mounting portion of the circuit board is omitted in the invention.

The pressable part of the invention may have any configuration as long as it is fixed directly or indirectly to the circuit board and positioned on the second region of the circuit board without contacting the at least one converter, the at least one optical fiber, or the at least one circuit. For example, the pressable part may be a handle fixed directly or indirectly to the second region of the circuit board without contacting the at least one converter, the at least one optical fiber, or the at least one circuit. Alternatively, the pressable part may include the second cover portion and the second attachment portion of any of the above aspects.

The external connecting part of the invention is not limited to a male connector and a female connector but may be any part or member that is connectable to a connecting part of a host board of an electronic device by applying load in the Z' direction on the external connecting part. For example, the external connecting part of the invention may be at least one pin, terminal, etc.

The connecting part on the host circuit board of the electronic device of the invention may be any part or member that is connectable in Z-Z' direction to the external connecting part of any of the above aspects. For example, the connecting part of the electronic device of the invention may be a connector or a like member to press-fit thereinto the external connecting part being at least one pin, terminal, etc.

It should be appreciated that the above embodiments and variants of the optical fiber assemblies and connection structures are described above by way of examples only. The materials, shapes, dimensions, numbers, arrangements, and other configurations of the constituents of the optical fiber assemblies and connection structures may be modified in any manner if they can perform similar functions. The configurations of the embodiments and the variants described above may be combined in any possible manner. The first direction (Y-Y' direction) of the invention may be any direction substantially parallel to the first face of the circuit board of the invention. The second direction (X-X' direction) of the invention may be any direction intersecting the first direction and orthogonal to the third direction. The third direction (Z-Z' direction) of the invention may be any direction orthogonal to the first and second directions.

The present invention can include any combination of these various features or embodiments above and/or below as set-forth in sentences and/or paragraphs. Any combination of disclosed features herein is considered part of the present invention and no limitation is intended with respect to combinable features.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

REFERENCE SIGNS LIST

A1, A2: optical fiber assembly
100: circuit board
  110: first face
    111: first region
    112: second region
  120: second face
    121: third region
    122: fourth region
  130: first mounting portion
  140: second mounting portion
200: converter
300: optical fiber
  310: first portion
  320: second portion
400: circuit
500: external connecting part
600, 600': cover
  610: cover body
    611: first cover portion
    612: second cover portion
  620: first attachment portion
    621a, 621b: first leg
    622a, 622b: first hook
  630: second attachment portion
    631a, 631b: second leg
    632a, 632b: second hook
  620': first attachment portion
    621': hook
    622a', 622b': abutment
  630': second attachment portion
    631a', 631b': second leg
  700a, 700b: fixed part
D: electronic device
  10: host circuit board
  20: connecting part

What is claimed is:
1. An optical fiber assembly comprising:
a circuit board including a first face and a second face on the opposite side to the first face, the first face having first and second regions being different regions from each other, and the second face having a third region on the opposite side to the first region and a fourth region on the opposite side to the second region;
a converter being an opto-electronic or electro-optic converter on the first region of the circuit board;
an optical fiber including a first portion being a leading end portion of the optical fiber, the first portion being optically connected to the converter;
a circuit on the first region of the circuit board, the circuit being electrically connected to the converter;
an external connecting part on the fourth region of the circuit board;
a pressable part fixed directly or indirectly to the circuit board such as to be positioned on the second region of the circuit board without contacting the converter, the optical fiber, or the circuit; and
a cover having electrical conductivity, wherein
the circuit board further includes: 'a first mounting portion on one side of a first direction of the circuit board, the first mounting portion including a first end portion on one side of a second direction and a second end portion on the other side of the second direction, the first direction extending substantially parallel to the first face of the circuit board and the second direction intersecting the first direction,
a second mounting portion on the other side of the first direction relative to the first mounting portion and the first region of the circuit board, and
a pair of first stops including one and the other first stops on the one and other sides, respectively, of the second direction, the one first stop is positioned on the other side of the first direction, and projects to the one side of the second direction, relative to the first end portion of the first mounting portion, the other first stop is positioned on the other side of the first direction, and projects to the other side of the second direction, relative to the second end portion of the first mounting portion, the cover includes:
- a cover body covering the first and second regions of the first face of the circuit board, the converter, the first portion of the optical fiber, and the circuit,
- a first attachment portion fixed directly or indirectly to the first mounting portion of the circuit board, and
- a second attachment portion fixed directly or indirectly to the second mounting portion of the circuit board, the pressable part is constituted by a portion of the cover body that is located over the second region, and the second attachment portion, the first attachment portion includes a pair of first legs extending from the cover body toward the circuit board, the first legs including one and the other first legs, the one and the other first legs including one and the other first hooks, respectively, the one first hook is generally of lateral U-shape projecting to the one side of the second direction, the one first hook being fittingly engaged with the first end portion of the first mounting portion of the circuit board and abutting the one first stop from the one side of the first direction, and the other first hook is generally of lateral U-shape projecting to the other side of the second direction, the other first hook being fittingly engaged with the second end portion of the first mounting portion of the circuit board and abutting the other first stop from the one side of the first direction.

2. The optical fiber assembly according to claim 1, wherein
the first region of the circuit board is positioned on one side of a first direction relative to the second region of the circuit board, the first direction extending substantially parallel to the first face of the circuit board, the optical fiber further includes a second portion extending to the other side of the first direction, from the first portion of the optical fiber and across the second region of the circuit board, and the pressable part includes:
- a cover portion extending over the second region of the circuit board and covering the second portion of the optical fiber in a noncontact manner, and
- a pair of legs extending from the cover portion toward the circuit board on opposite sides of the second portion of the optical fiber without contacting the second portion, the legs being fixed directly or indirectly to the circuit board.

3. The optical fiber assembly according to claim 1, wherein
the first mounting portion includes:
- a first end portion on one side of a second direction, the second direction intersecting the first direction, and
- a second end portion on the other side of the second direction, the first attachment portion includes a pair of first legs extending from the cover body toward the circuit board, and the first legs are provided with respective engagement holes to fittingly receive corresponding engaging protrusions on the end faces of the first and second end portions of the first mounting portion, or alternatively the end faces of the first and second end portions of the first mounting portion are provided with respective engagement holes to fittingly receive corresponding engaging protrusions on the first legs.

4. The optical fiber assembly according to claim 1 further comprising a pair of fixed parts, wherein
the fixed parts are fixed to the first region of the circuit board, without contacting the converter, the optical fiber, or the circuit, the first attachment portion includes a pair of first legs extending from the cover body toward the circuit board, and the first legs are fixed to the respective fixed parts.

5. The optical fiber assembly according to claim 1, wherein
the second mounting portion includes
- a first end portion on one side of a second direction, the second direction intersecting the first direction, and
- a second end portion on the other side of the second direction, the circuit board further includes a pair of second stops including one and the other second stops on the one and other sides, respectively, of the second direction, the one second stop is positioned on the one side of the first direction, and projects to the one side of the second direction, relative to the first end portion of the second mounting portion, the other second stop is positioned on the one side of the first direction, and projects to the other side of the second direction, relative to the second end portion of the second mounting portion, the second attachment portion includes a pair of second legs extending from the cover body toward the circuit board, the second legs including one and the other second legs, the one and the other second legs including one and the other second hooks, respectively, the one second hook is generally of lateral U-shape projecting to the one side of the second direction, the one second hook being fittingly engaged with the first end portion of the second mounting portion of the circuit board and abutting the one second stop from the other side of the first direction, and the other second hook is generally of lateral U-shape projecting to the other side of the second direction, the other second hook being fittingly engaged with the second end portion of the second mounting portion of the circuit board and abutting the other second stop from the other side of the first direction.

6. The optical fiber assembly according to claim 1, wherein
the second mounting portion includes
- a first end portion on one side of a second direction, the second direction intersecting the first direction, and
- a second end portion on the other side of the second direction, the circuit board further includes a pair of second stops including one and the other second stops on the one and other sides, respectively, of the second direction, the one second stop is positioned on the one side of the first direction, and projects to the one side of the second direction, relative to the first end portion of the second mounting portion, the other second stop is positioned on the one side of the first direction, and projects to the other side of the second direction, relative to the second end portion of the second mounting portion, the second attachment portion includes a pair of second legs extending from the cover body toward the circuit board, the second legs including one and the other second legs, the one and the other second legs including one and the other second hooks, respectively, the one second hook is generally of lateral U-shape projecting to the one side of the second direction, the one second hook being fittingly engaged with the first end portion of the second mounting portion of the circuit board and abutting the one second stop from the other side of the first direction, and the other second hook is generally of lateral U-shape projecting to the other side of the second direction, the other second hook being fittingly engaged with the second end portion of the second mounting portion of the circuit board and abutting the other second stop from the other side of the first direction.

7. The optical fiber assembly according to claim 1, wherein the second attachment portion includes a second leg extending from the cover body toward the circuit board, the second leg including a second hook of lateral U-shape projecting to the other side of the first direction, and the second hook fittingly receives the second mounting portion of the circuit board from the one side of the first direction.

8. The optical fiber assembly according to claim 1, wherein the second attachment portion includes a second leg extending from the cover body toward the circuit board, the second leg including a second hook of lateral U-shape projecting to the other side of the first direction, and the second hook fittingly receives the second mounting portion of the circuit board from the one side of the first direction.

9. The optical fiber assembly according to claim 1, wherein the second mounting portion includes:
a first end portion on one side of a second direction, the second direction intersecting the first direction, and
a second end portion on the other side of the second direction, the second attachment portion includes a pair of second legs extending from the cover body toward the circuit board, and one of the second legs is fitted in an engagement hole or recess in the first end portion of the second mounting portion, and the other second leg is fitted in an engagement hole or recess in the second end portion of the second mounting portion.

10. The optical fiber assembly according to claim 1, wherein the second mounting portion includes:
a first end portion on one side of a second direction, the second direction intersecting the first direction, and
a second end portion on the other side of the second direction, the second attachment portion includes a pair of second legs extending from the cover body toward the circuit board, and the second legs are provided with respective engagement holes to fittingly receive corresponding engaging protrusions on the end faces of the first and second end portions of the second mounting portion, or alternatively the end faces of the first and second end portions of the second mounting portion are provided with respective engagement holes to fittingly receive corresponding engaging protrusions on the second legs.

11. The optical fiber assembly according to claim 1 further comprising a pair of fixed parts, wherein the fixed parts are fixed to the second region of the circuit board, without contacting the converter, the optical fiber, or the circuit, the second attachment portion includes a pair of second legs extending from the cover body toward the circuit board, and the second legs are fixed to the respective fixed parts.

12. A connection structure of an optical fiber assembly and an electronic device, comprising:

the optical fiber assembly according to claim 1; and an electronic device, the electronic device including a connecting part and a host circuit board with the connecting part mounted thereon, wherein the first and second faces of the circuit board of the optical fiber assembly are the faces of the circuit board on one and the other sides, respectively, of a third direction, the third direction being the thickness direction of the circuit board of the optical fiber assembly, and the external connecting part of the optical fiber assembly is connected to the connecting part of the electronic device, with the external connecting part of the optical fiber assembly fitted in the connecting part of the electronic device from the one side of the third direction, or alternatively with the connecting part of the electronic device fitted in the external connecting part of the optical fiber assembly from the other side of the third direction.

13. The optical fiber assembly according to claim 1, wherein the first attachment portion includes a first leg extending from the cover body toward the circuit board, the first leg including a first hook generally of lateral U-shape projecting to the one side of the first direction, and the first hook fittingly receives the first mounting portion of the circuit board from the other side of the first direction.

14. The optical fiber assembly according to claim 13, wherein the second mounting portion includes
a first end portion on one side of a second direction, the second direction intersecting the first direction, and
a second end portion on the other side of the second direction, the circuit board further includes a pair of second stops including one and the other second stops on the one and other sides, respectively, of the second direction, the one second stop is positioned on the one side of the first direction, and projects to the one side of the second direction, relative to the first end portion of the second mounting portion, the other second stop is positioned on the one side of the first direction, and projects to the other side of the second direction, relative to the second end portion of the second mounting portion, the second attachment portion includes a pair of second legs extending from the cover body toward the circuit board, the second legs including one and the other second legs, the one and the other second legs including one and the other second hooks, respectively, the one second hook is generally of lateral U-shape projecting to the one side of the second direction, the one second hook being fittingly engaged with the first end portion of the second mounting portion of the circuit board and abutting the one second stop from the other side of the first direction, and the other second hook is generally of lateral U-shape projecting to the other side of the second direction, the other second hook being fittingly engaged with the second end portion of the second mounting portion of the circuit board and abutting the other second stop from the other side of the first direction.

15. An optical fiber assembly comprising:
a circuit board including a first face and a second face on the opposite side to the first face, the first face having first and second regions being different regions from each other, and the second face having a third region on the opposite side to the first region and a fourth region on the opposite side to the second region;
a converter being an opto-electronic or electro-optic converter on the first region of the circuit board;
an optical fiber including a first portion being a leading end portion of the optical fiber, the first portion being optically connected to the converter;
a circuit on the first region of the circuit board, the circuit being electrically connected to the converter;
an external connecting part on the fourth region of the circuit board;
a pressable part fixed directly or indirectly to the circuit board such as to be positioned on the second region of the circuit board without contacting the converter, the optical fiber, or the circuit; and
a cover having electrical conductivity, wherein the circuit board further includes:
  a first mounting portion on one side of a first direction of the circuit board, the first direction extending substantially parallel to the first face of the circuit board, and
  a second mounting portion on the other side of the first direction relative to the first mounting portion and the first region of the circuit board,
the cover includes:
  a cover body covering the first and second regions of the first face of the circuit board, the converter, the first portion of the optical fiber, and the circuit,
  a first attachment portion fixed directly or indirectly to the first mounting portion of the circuit board, and
  a second attachment portion fixed directly or indirectly to the second mounting portion of the circuit board, and
the pressable part is constituted by a portion of the cover body that is located over the second region, and the second attachment portion,
the second direction intersects the first direction, and the third direction is substantially orthogonal to the first and second directions and includes one and the other sides of the third direction, and
the first attachment portion includes:
  a hook generally of L-shape in side view, the hook extending from the cover body toward the circuit board and being in contact with faces of the first mounting portion of the circuit board on the one side of the first direction and on the other side of the third direction, and
  an abutment extending from the cover body toward the circuit board and being in contact with a face of the first mounting portion on the one side of the third direction, without contacting the converter, the optical fiber, or the circuit.

16. The optical fiber assembly according to claim 15, wherein
the second mounting portion includes
  a first end portion on one side of a second direction, the second direction intersecting the first direction, and
  a second end portion on the other side of the second direction,
the circuit board further includes a pair of second stops including one and the other second stops on the one and other sides, respectively, of the second direction,
the one second stop is positioned on the one side of the first direction, and projects to the one side of the second direction, relative to the first end portion of the second mounting portion,
the other second stop is positioned on the one side of the first direction, and projects to the other side of the second direction, relative to the second end portion of the second mounting portion,
the second attachment portion includes a pair of second legs extending from the cover body toward the circuit board, the second legs including one and the other second legs, the one and the other second legs including one and the other second hooks, respectively,
the one second hook is generally of lateral U-shape projecting to the one side of the second direction, the one second hook being fittingly engaged with the first end portion of the second mounting portion of the circuit board and abutting the one second stop from the other side of the first direction, and
the other second hook is generally of lateral U-shape projecting to the other side of the second direction, the other second hook being fittingly engaged with the second end portion of the second mounting portion of the circuit board and abutting the other second stop from the other side of the first direction.

17. The optical fiber assembly according to claim 15 further comprising a pair of fixed parts, wherein
the fixed parts are fixed to the second region of the circuit board, without contacting the converter, the optical fiber, or the circuit,
the second attachment portion includes a pair of second legs extending from the cover body toward the circuit board, and
the second legs are fixed to the respective fixed parts.

18. An optical fiber assembly comprising:
a circuit board including a first face and a second face on the opposite side to the first face, the first face having first and second regions being different regions from each other, and the second face having a third region on the opposite side to the first region and a fourth region on the opposite side to the second region;
a converter being an opto-electronic or electro-optic converter on the first region of the circuit board;
an optical fiber including a first portion being a leading end portion of the optical fiber, the first portion being optically connected to the converter;
a circuit on the first region of the circuit board, the circuit being electrically connected to the converter;
an external connecting part on the fourth region of the circuit board;
a pressable part fixed directly or indirectly to the circuit board such as to be positioned on the second region of the circuit board without contacting the converter, the optical fiber, or the circuit; and
a cover having electrical conductivity, wherein
the circuit board further includes:
  a first mounting portion on one side of a first direction of the circuit board, the first direction extending substantially parallel to the first face of the circuit board, and
  a second mounting portion on the other side of the first direction relative to the first mounting portion and the first region of the circuit board,
the cover includes:
  a cover body covering the first and second regions of the first face of the circuit board, the converter, the first portion of the optical fiber, and the circuit,
  a first attachment portion fixed directly or indirectly to the first mounting portion of the circuit board, and
  a second attachment portion fixed directly or indirectly to the second mounting portion of the circuit board, and the pressable part is constituted by a portion of the cover body that is located over the second region, and the second attachment portion,
the first mounting portion includes:
  a first end portion on one side of a second direction, the second direction intersecting the first direction, and
  a second end portion on the other side of the second direction,
the first attachment portion includes a pair of first legs extending from the cover body toward the circuit board, and
one of the first legs is fitted in an engagement hole or recess in the first end portion of the first mounting portion, and the other first leg is fitted in an engagement hole or recess in the second end portion of the first mounting portion.

* * * * *